US008641874B2

(12) United States Patent
Kuiphoff

(10) Patent No.: US 8,641,874 B2
(45) Date of Patent: Feb. 4, 2014

(54) COMPACT CLOSED-LOOP ELECTROLYZING PROCESS AND APPARATUS

(75) Inventor: John Kuiphoff, Edgewater, FL (US)

(73) Assignee: Rayne Guest, San Marcos, TX (US)

( * ) Notice: Subject to any disclaimer, the term of this patent is extended or adjusted under 35 U.S.C. 154(b) by 279 days.

(21) Appl. No.: 13/008,152

(22) Filed: Jan. 18, 2011

(65) Prior Publication Data

US 2012/0145537 A1   Jun. 14, 2012

Related U.S. Application Data

(60) Provisional application No. 61/421,478, filed on Dec. 9, 2010.

(51) Int. Cl.
*C25B 9/00* (2006.01)
*C25B 1/16* (2006.01)

(52) U.S. Cl.
USPC ........... 204/237; 204/193; 204/194; 204/242; 205/508; 205/762

(58) Field of Classification Search
USPC ........... 204/237, 193, 194, 242; 205/762, 508
See application file for complete search history.

(56) References Cited

U.S. PATENT DOCUMENTS

| | | | |
|---|---|---|---|
| 2004/0124094 A1* | 7/2004 | Bo et al. | 205/503 |
| 2005/0139808 A1* | 6/2005 | Alimi | 252/187.26 |
| 2006/0260954 A1* | 11/2006 | Sano et al. | 205/742 |
| 2010/0270172 A1* | 10/2010 | Sano | 205/748 |

* cited by examiner

*Primary Examiner* — Harry D Wilkins, III
*Assistant Examiner* — Zulmariam Mendez
(74) *Attorney, Agent, or Firm* — David S. Nagy

(57) ABSTRACT

This is an electrolytic apparatus and process for the production of Hypochlorous Acid (HClO) and Sodium Hydroxide (NaOH) in a closed-loop arrangement. A brine solution in an electrolyzer cell is subjected to an electric current, causing HClO and/or NaOH to be produced in water circulated through the cell. The produced solution is recirculated through the cell as its chemical properties are monitored by a sensor, connected by a controller which controls a recirculating pump and the electric current, until the sensor indicates that the concentration of the solution has reached a desired value, and the controller stops the process.

16 Claims, 5 Drawing Sheets

US 8,641,874 B2

COMPACT CLOSED-LOOP ELECTROLYZING PROCESS AND APPARATUS

This application claims the priority of Provisional Application 61/421,478 by the same inventor, filed Dec. 19, 2010.

BACKGROUND OF THE INVENTION

There has always been a market for effective and safe cleaning products. Of late, however, the definition of "safe" has broadened to include considerations not just of immediate, localized toxicity, but also of the dangers posed by long-term use and exposure of cleaning products to individuals and the environment. For example, the cleaning benefits of phosphates are now seen as outweighed by their environmental costs, and they are now banned in a number of states. Thus, there is an increasing emphasis on and desire for environmentally friendly cleaning agents.

Among such agents are Hypochlorous Acid (HClO) and Sodium Hydroxide (NaOH) solutions, particularly effective as a sanitizer and degreaser, respectively. The beneficial and environmentally benign properties of these compounds have been known for a long time, and an effective way of producing these compounds by electrolyzing a brine solution and passing it through an appropriate ion transfer membrane has been know for decades.

Unfortunately, existing processes and apparatuses for producing these compounds have been large and energy-intensive. They have also been potentially wasteful, producing both compounds at once, and thus producing a potentially wasted excess of one when only the other is desired.

This invention addresses these shortcomings with a process and apparatus that is compact enough for home use, has extremely low energy consumption and can produce a desired amount of just one of the compounds at a time.

BRIEF SUMMARY OF THE INVENTION

This invention is a closed-loop process and apparatus for producing HClO and/or NaOH. It comprises a product container filled with a desired amount of ordinary water, connected to an electrolyzer cell. The electrolyzer cell is a container equipped with an ion transfer membrane of the appropriate specification for the purpose of the application: the production of HClO or NaOH. This membrane separates the electrolyzer cell into two chambers, each equipped with an electrode. One chamber—the brine chamber—contains a brine solution—ordinary table salt (NaCl) dissolved in water—and the other chamber—the ionizing chamber—contains water pumped from the product container into one end of the ionizing chamber and back to the product container from another end, forming the closed loop already mentioned. A pump is inserted into this loop to circulate the water.

When the electrode in the brine solution—the brine electrode—is negatively charged, and the electrode in the ionizing chamber—the ionizing electrode—is positively charged, and the membrane is appropriately sized for the passage of Chloride ions, then HClO is produced in the ionizing chamber. It is pumped into the product container, while the now somewhat-acidic solution in the product container is pumped back through the ionizing chamber in a closed loop, continuing until the solution reaches the desired concentration of HClO.

By carrying out this process with the polarity of the electrodes reversed and the membrane appropriately sized for the passage of Sodium ions, then NaOH is produced in the ionizing chamber. The apparatus necessary for this process can be made very compact so as to be suitable for household use, and it can also be automated through the use of sensors and controllers that stop—and even start—the process according to pre-set values. The process uses so little current that it can even be advantageously battery-powered.

DETAILED DESCRIPTION OF THE INVENTION

Figure 1:
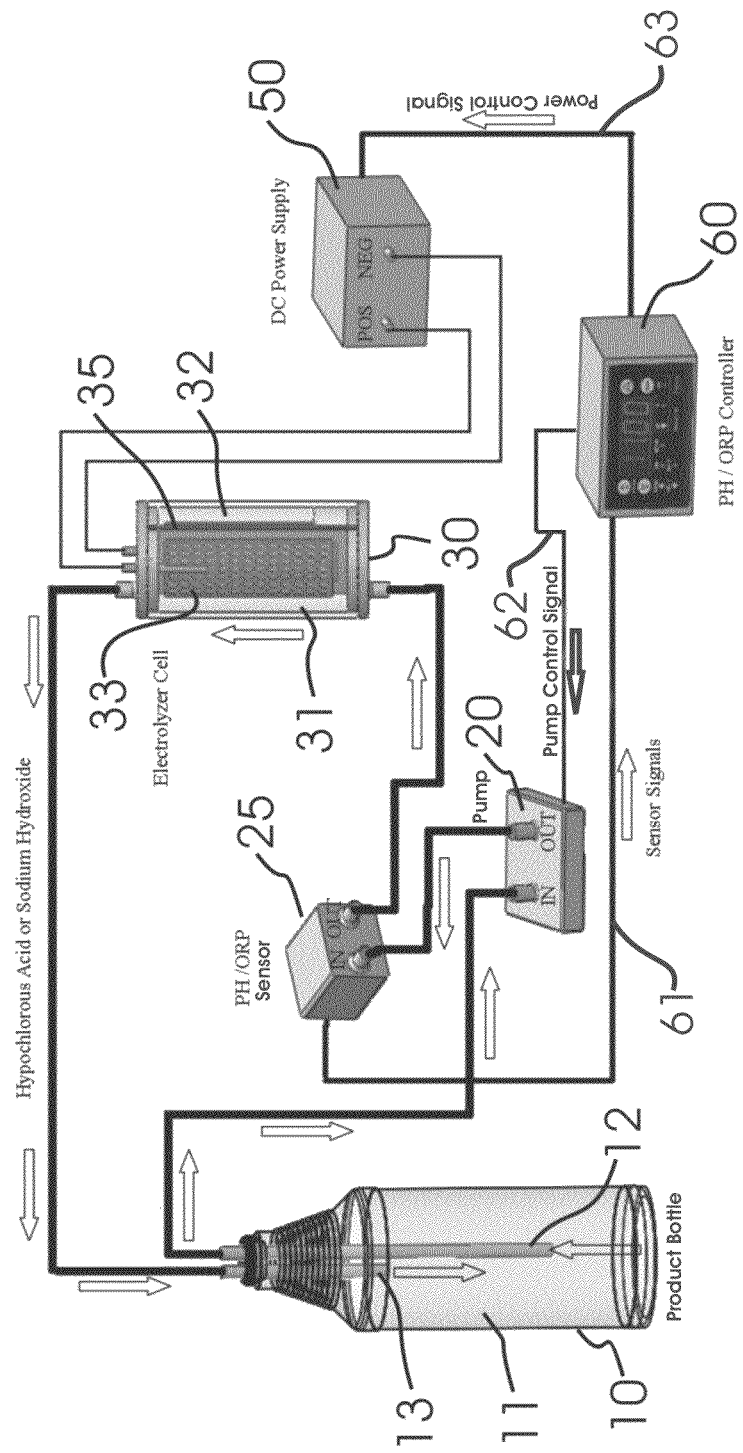
FIG. 1 shows a diagram of the process and apparatus, with a product container (10)—containing liquid (11) and exit (12) and return (13) tubes—a pump (20), a sensor (25), an electrolyzer cell (30)—comprising an ionizing chamber (31) containing an ionizing electrode (33) and a brine chamber (32) containing a brine electrode (34—not depicted in this Figure), and a membrane (35) separating the brine chamber from the ionizing chamber—a DC power supply (65) and a controller (60), which receives sensor signals (61) from the sensor and sends a power control signal (63) to the DC power supply and a pump control signal (63) to the pump.

Liquid (11)—initially pure water—passes from the product container (10) through the exit tube (12) and the pump

(20) and the liquid inlet (36) into the ionizing chamber (31), where it absorbs ions traveling through the membrane (35), which have been derived from the salt brine (40) in the brine chamber (32) by applying an electrical current to the electrodes (33 and 34); the liquid then passes through the liquid outlet (37) and returns to the product container (10) via the return (13) tube.

The two electrodes are electrically connected to a DC power supply (65), and this power supply and the pump (20) are controlled by a controller (60), which receives information from the sensor (25). The sensor (25) measures the pH and oxidation reduction potential (ORP) of the liquid passing through it, and sends the information it collects to the controller (60). The controller (60) compares this information to predetermined values and controls the pump (20) and DC power supply (40) according to the results of that comparison: if, for example, the pH of the liquid is insufficiently high or low—depending upon whether one is producing NaOH or HClO, respectively—the controller continues to deliver power to the pump and electrodes (33 and 34); once the predetermined value is reached, the controller cuts power delivery to the pump and electrodes, and the liquid in the product container (10) is ready to use.

It should be noted that the positioning of the liquid inlet (36) and liquid outlet (37) in the ionizing chamber (31) should be thus that they are as widely separated as possible, so that the liquid extracted from the ionizing chamber has absorbed as many ions as possible; for analogous reasons, the same is true for the positioning on the exit and return tubes (12 and 13, respectively) in the product container (10).

Over time, the salt brine (40) will become depleted of the ion being electrolyzed through the membrane (35) and will need to be discarded and replaced—this can be specified as being necessary after the production of a certain amount of product or the passage of a particular length of time or, optionally, the controller can measure this depletion and signal the need for replacement. Alternatively and advantageously, if two apparatuses are being used to produce the complementary compounds, their depleted brine solutions can be swapped out with each other: a brine solution depleted of Sodium ions from the production of NaOH will be rich in Chlorine ions, allowing it to still produce HClO when transplanted to a complementary apparatus; and vice versa.

Neither the NaOH product nor the HClO product is a permanently stable compound, and both will decay over time. Accordingly, after the desired concentration of NaOH or HClO has been produced and the process has been stopped, it can be helpful for the controller (60) to start the pump (20) periodically to monitor the pH and/or ORP and, if this measurement no longer meets the predetermined value, the controller can re-energize the electrodes (33 and 34) and re-start the process until the pH and/or ORP again meets the predetermined value, thus keeping the product fresh and ready to use.

In a typical household application, where the product container (10) is in the range of 0.5 to 1 liter and the power applied to the electrodes (33 and 34) is in the range of 5-24 volts and no more than approximately 8 amperes, there is little danger of excessive generation of heat or outgassing from the electrolyzing procedure. If, however, a larger volume or faster generation is specified, generation of heat and/or gas by-products may become an issue with the application of a greater wattage; in such a situation, the temperature of the salt brine (40) can be monitored via an additional sensor and reported to the controller (60) and, if an excessive reading is obtained, the salt brine can be pumped via a second pump through a second closed loop comprising a radiator or other heat exchanger and/or an air filter for safely exhausting gas by-products.

Figure 3:
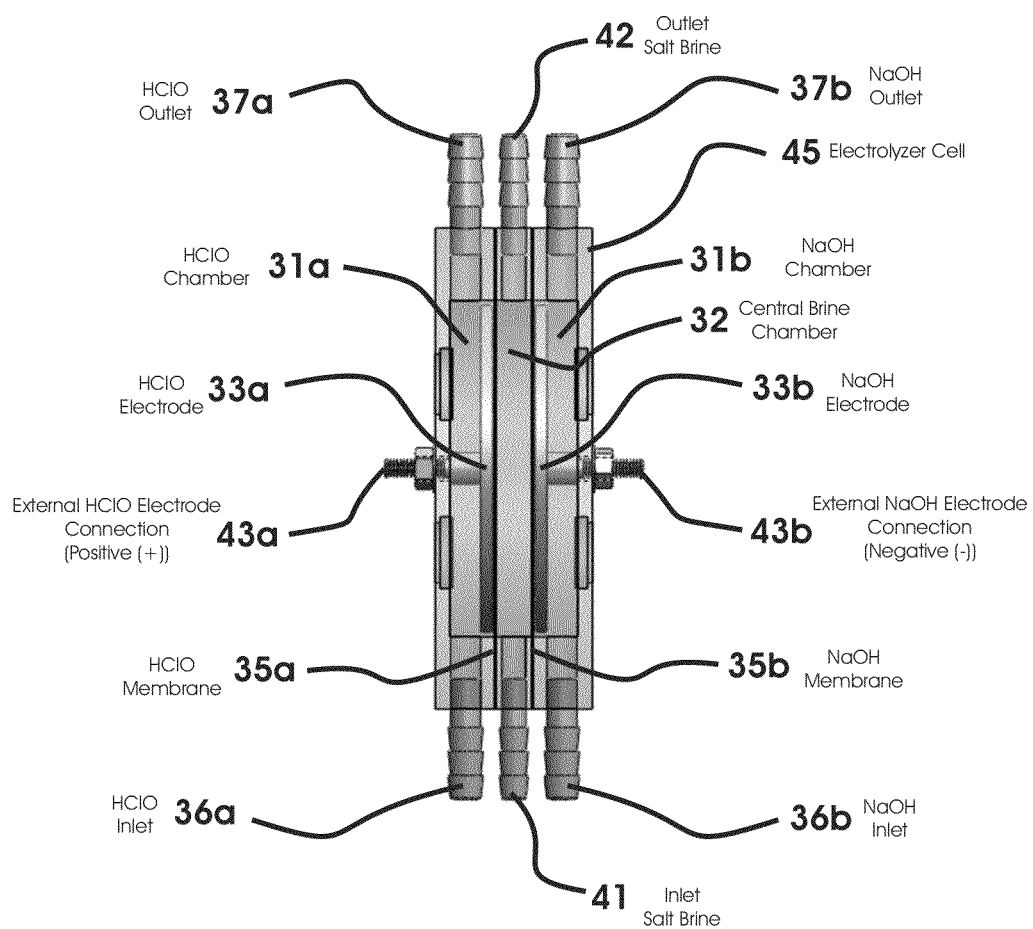
FIG. 3 shows a three-chamber electrolyzer cell (45) for simultaneous production of both Hypochlorous Acid (HClO) and Sodium Hydroxide (NaOH), with a central brine chamber (32) having an inlet (41) and outlet (42), flanked by an HClO membrane (35a) and an NaOH membrane (35b), which are in turn flanked by an HClO electrode (33a) and chamber (31a) and an NaOH electrode (33b) and chamber (31b), respectively. The HClO chamber has an inlet (36a) and outlet (37a), as does the NaOH chamber (36b and 37b, respectively), and each electrode (33a and 33b) has an external electrode connection (43a and 43b, respectively).

It can also be advantageous to generate both Hypochlorous Acid (HClO) and Sodium Hydroxide (NaOH) simultaneously, with attendant economies of operation. FIG. 3 shows an electrolyzer cell for such simultaneous production, with the brine chamber (32) sandwiched between two electrolyzing chambers—an HClO chamber (31a) and an NaOH chamber (31b)—separated by an HClO membrane (35a) and an NaOH membrane (35b), which are in turn flanked by an HClO electrode (33a) and an NaOH electrode (33b). Each of the two electrolyzing chambers, 31a and 31b, is connected to the same sort of closed loop depicted in FIG. 1, although it may be advantageous to have a single controller (60) control both loops. This would allow the single controller to balance the two processes out, should one get "ahead" of the other, e.g., if the production of HClO was happening faster than the production of NaOH, the single controller could slow down or stop the production of HClO until the production of NaOH "caught up", so that the Sodium and Chlorine ions in the brine solution would be depleted at the same pace.

Figure 2:
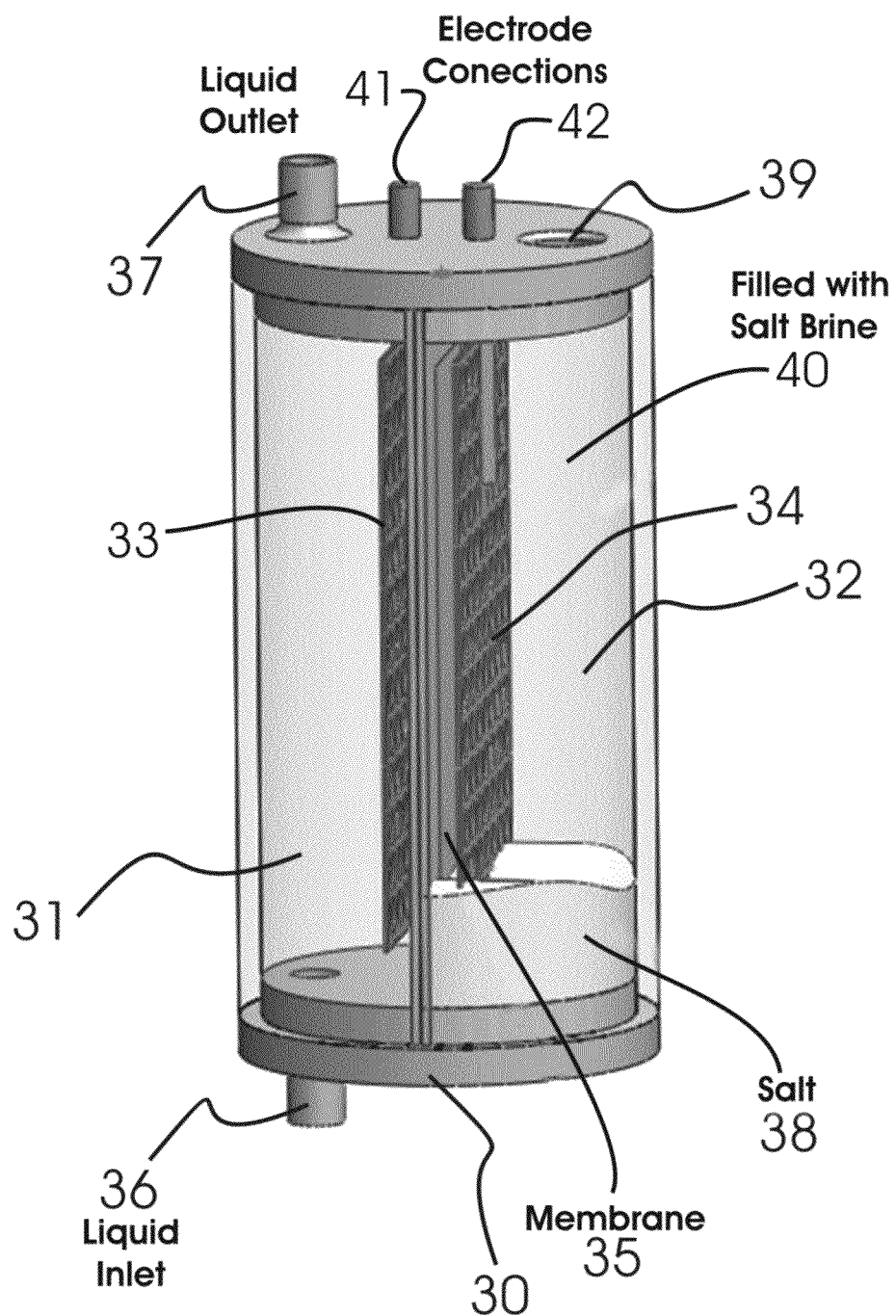
FIG. 2 shows the electrolyzer cell (30) in greater detail, with its brine chamber (32) containing a brine opening (39), brine electrode (34), salt brine (40) and salt (38), and a membrane (35) separating the brine chamber (32) from the ionizing chamber (31), which is equipped with an ionizing electrode (33) and a liquid inlet (36) and liquid outlet (37). The two electrodes (33 and 34) have electrode connections (41 and 42, respectively).
Figure 4:
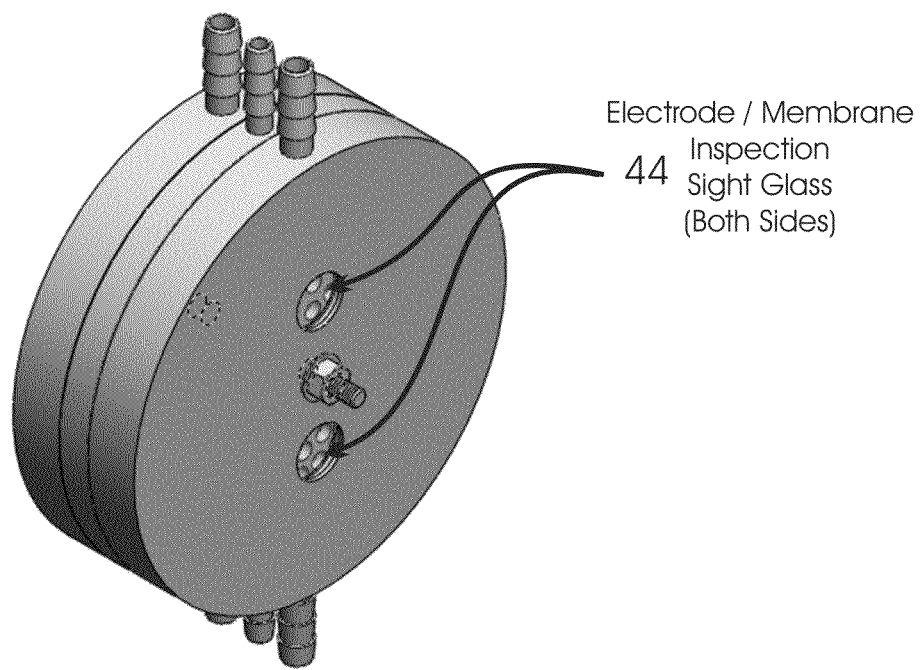
FIG. 4 shows a three-quarter view of the three chamber electrolyzer cell, showing the sight glass openings (44) that permit visual inspection of the condition of the electrodes and membranes.

FIG. 4 shows an electrolyzer cell—specifically a three-chamber version, although the feature depicted is advantageously applicable to the two-chamber version depicted in FIG. 2, as well—with sight glass windows (44) for the easy inspection of both the membrane(s) (35,35a, 35b) and the electrode(s) (33, 33a, 33b), allowing the operator to more easily determine when performance of the cell may be becoming degraded through clogging of the membrane and/or coating of the electrode from trace elements in the water used, such as calcium.

Figure 5:
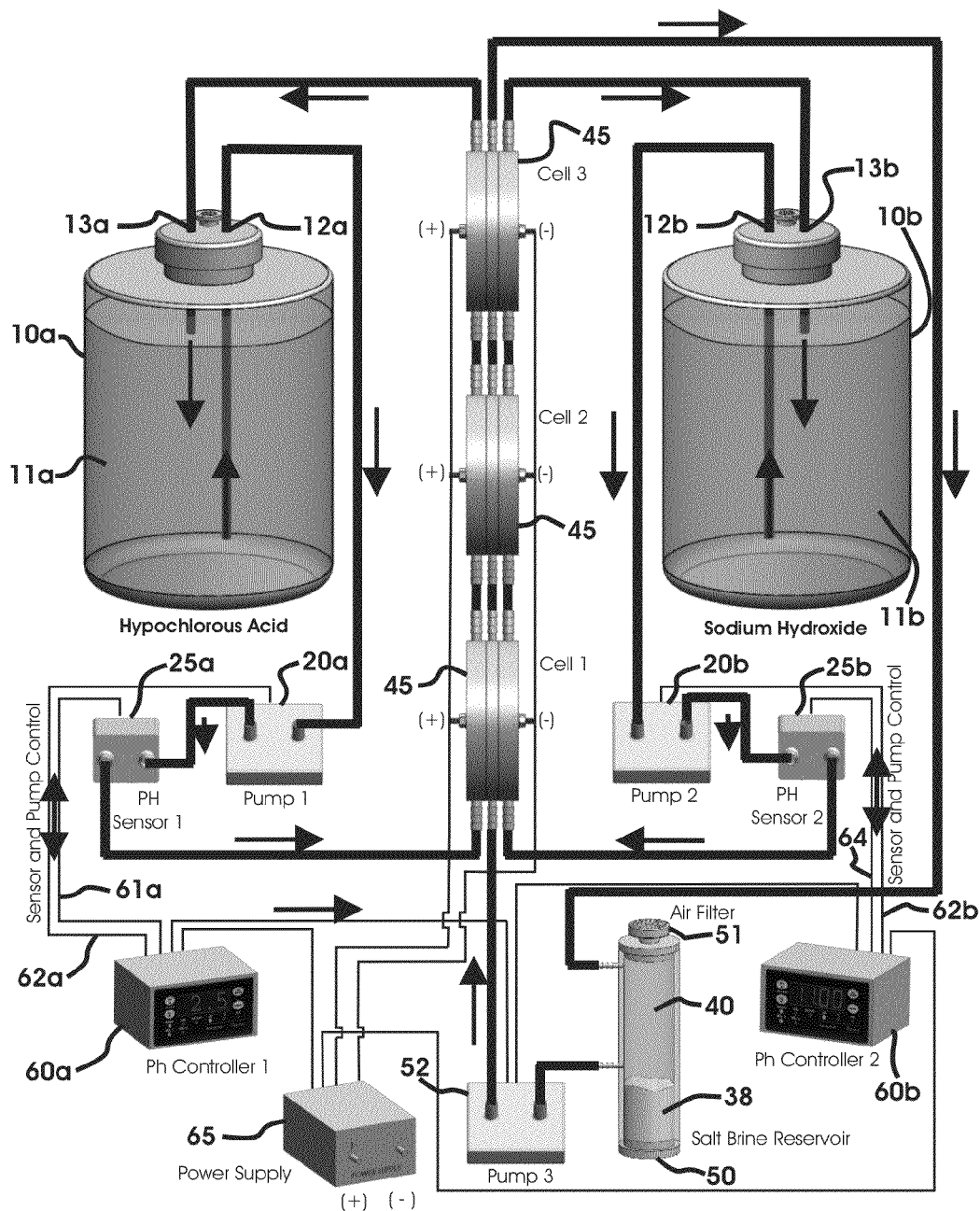
FIG. 5 shows an embodiment of the invention for larger-scale simultaneous production of both Hypochlorous Acid (HClO) and Sodium Hydroxide (NaOH) utilizing multiple three chamber electrolyzer cells (45), with liquid contents (11a and 11b) of HClO and NaOH product containers (10a and 10b) passing through exit tubes (12a and 12b), pumps (20a and 20b), pH sensors (25a and 25b) and multiple electrolyzer cells (45) before returning via return tubes (12a and 12b) to the HClO and NaOH containers (10a and 10b). There is also a separate salt brine reservoir (50) containing brine (40), extra salt (38) and a venting air filter (51), and brine (40) flows from the brine reservoir (50) through the brine pump (52) to and through the brine chambers of the several electrolyzer cells (45) and back to the brine reservoir (50). There is also a DC power supply (65) supplying power to the electrolyzer cells, and it and the pumps (20a, 20b and 52) are controlled by HClO and NaOH controllers (60a and 60b, respectively) on the basis of information supplied by their respective pH sensors (25a and 25b, respectively).

Another advantageous variation of this invention is the larger-volume application shown in FIG. 5, which depicts a simultaneous-generation system with the addition of multiple electrolyzer cells (45)—this particular depiction shows the cells arrayed in series, although they could also be arrayed in parallel, or even series-parallel. This larger-volume version also shows a third closed loop with a third pump, circulating the brine solution through the electrolyzer cells and a brine reservoir (50), which incorporates an air filter for safely exhausting gas by-products. The larger the volume of production and/or the faster its pace, the more likely it is that potentially troublesome quantities of gas by-products will be formed; for that reason, then, it is particularly advantageous to practice this invention in its simultaneous-production variant when opting for higher-volume and/or faster production, as the ability to balance the processes tends to insure that the likely gas by-products of single-product production, Hydrogen and Chlorine, are instead consumed in the production of the HClO and NaOH.

It is also easily understood that the apparatus used to practice this invention can be equipped with additional features known in the art, such as taps allowing product to be dispensed from the product container, or from elsewhere in the production loop, without shutting down the process or removing the product container from the loop. Such a variation would, in turn, benefit from automatic ingredient replenishment arrangements, whereby water could be automatically added to the product container when the level of liquid in it fell below a certain point, and salt could be automatically added to the brine chamber or brine reservoir should the salinity of its liquid drop below a predetermined level; the apparatus can also be provided with means for agitating the salt in the brine chamber or brine reservoir, or some other means for promoting the dissolving of salt.

There is one additional variation on this process, which may be especially attractive because of greater simplicity and economy, albeit at the expense of precision: with a minimum of trial and error with a particular apparatus, initial brine concentration and power application, it is readily possible to determine to a fair degree of precision how long the process needs to run to produce NaOH or HClO of a particular concentration. Thus, it would be possible to replace the sensor(s) and controller(s) with a simple timer, which would run the process—by energizing the pump(s) and electrodes—for that predetermined length of time and produce the desired concentration of product. Optionally, the timer could have multiple settings, allowing the operator to select from a variety of concentrations of product.

Of course, such a variation would not operate with the same precision as one governed by an accurate pH/ORP sensor, nor would it have the monitoring function, alluded to earlier, of maintaining unused product at the desired concentration; while it is theoretically possible to chart the rate of decay of these compounds and compensate for that by having an electronic timer restart the process occasionally, in practice the effect of environmental variations on the rate of decay would tend to render such an option of questionable value, and even possibly dangerous, as it might lead to the production of an excessively high concentration of product.

This danger of excessive concentration is obviously something to be guarded against in the programming of any controller, as concentrations in excess of around 75-200 ppm with a pH of approx. 2.5-2.0 in the case of Hypochlorous Acid, and a pH range of 10.5-11.5 in the case of Sodium Hydroxide, can be caustic. For a timer application, some sort of failsafe provision is certainly advisable, perhaps an interlock that does not permit the re-starting of the timer unless the product container has been first removed from the system, and then re-connected to it—presumably emptied of product and refilled with water.

As is well known in this art, the purity of both the salt and water used can have a major effect on the duty cycle of the membrane(s) and electrodes, and users should select their materials accordingly. Also, while pumps have been specified as an easy means of circulating the product in these closed loops, it can readily be understood that this circulation can also be achieved by other means, including gravity, the tapping of pressure from off-gassing, etc.

It should be understood that the examples illustrated and described herein are for ease of understanding and are not exhaustive, and that there are many additional variations possible for the practicing of the invention disclosed herein.

I claim:

1. An apparatus for the production of Hypochlorous Acid (HClO) and Sodium Hydroxide (NaOH) comprising:
    an electrolyzer cell, comprising:
        a brine chamber containing a solution of Sodium Chloride (NaCl) and water;
        a first ionizing chamber—the HClO chamber—having an inlet and an outlet;
        a first ion-exchange membrane—the HClO membrane—which separates the HClO chamber and the brine chamber, the HClO membrane permitting the passage of Chloride ions and resisting the passage of Sodium ions;
        a second ionizing chamber—the NaOH chamber—having an inlet and an outlet;
        a second ion-exchange membrane—the NaOH membrane—which separates the NaOH chamber and the brine chamber, the NaOH membrane resisting the passage of Chloride ions and permitting the passage of Sodium ions;
        a first electrode—the HClO electrode—in the HClO chamber;
        a second electrode—the NaOH electrode—in the NaOH chamber;
        said first and second electrodes being electrically connected to the positive and negative taps, respectively, of a DC power supply having a positive tap and a negative tap;
        a first pump—the HClO pump—having a pressure and a vacuum side;
        a first product container—the HClO container—having an exit and a return;
        the pressure side of the HClO pump being connected to the inlet of the HClO chamber, the vacuum side of the HClO pump being connected to the exit of the HClO container, and the outlet of the HClO chamber being connected to the return of the HClO container;
        a second pump—the NaOH pump—having a pressure and a vacuum side;
        a second product container—the NaOH container—having an exit and a return;
        the pressure side of the NaOH pump being connected to the inlet of the NaOH chamber, the vacuum side of the NaOH pump being connected to the exit of the NaOH container, and the outlet of the NaOH chamber being connected to the return of the NaOH container;
    said product containers being filled at the start of the operation of the apparatus with water, the connection from product containers to pumps to ionizing chambers and back to product containers presenting closed loops, so that when said pumps are energized the water from said product containers is pumped through said ionizing chambers and back through said product containers continuously through said closed loops to increase the concentration of the products produced in the ionizing chambers, such that when said DC power supply is energized HClO is produced in the first ionizing chamber, and NaOH is produced in the second ionizing chamber.

2. The apparatus of claim 1, wherein said closed loops are further provided with sensors, which measure the pH and/or oxidation reduction potential (ORP) of the liquid passing through said closed loops, said sensors being connected to one or more controllers, said one or more controllers being connected to said pumps and said DC power supply and controlling the operation of all three according to the measurements supplied by said sensors, said one or more controllers being programmed to energize said pumps and DC power supply until sensor measurements indicate that pH and/or ORP equal predetermined values.

3. The apparatus of claim 2, wherein said brine chamber has an inlet and an outlet;
    said brine chamber is connected to a third pump;
    said third pump is connected to a brine reservoir;
    said brine reservoir is connected to said brine chamber, describing a third closed loop;
    and said third pump is controlled by said one or more controllers.

4. The apparatus of claim 3, comprising a plurality of electrolyzer cells, the identical chamber of the respective cells being connected to each other within their respective closed loops in series, in parallel, or in series-parallel.

5. The apparatus of claim 4, wherein said brine reservoir is further equipped with an air filter vent for the release of gas by-products.

6. The apparatus of claim 1, wherein said pumps and said DC power supply are controlled and energized by a timer adapted to energize said pumps and DC power supply for a period or a plurality of periods of time necessary for the apparatus to produce a specific concentration of product or a plurality of specific concentrations of product.

7. A process for the production of Hypochlorous Acid (HClO) and Sodium Hydroxide (NaOH) comprising utilizing:
   an electrolyzer cell, comprising:
      a brine chamber containing a solution of Sodium Chloride (NaCl) and water;
      a first ionizing chamber—the HClO chamber—having an inlet and an outlet;
      a first ion-exchange membrane—the HClO membrane—which separates the HClO chamber and the brine chamber, the HClO membrane permitting the passage of Chloride ions and resisting the passage of Sodium ions;
      a second ionizing chamber—the NaOH chamber—having an inlet and an outlet;
      a second ion-exchange membrane—the NaOH membrane—which separates the NaOH chamber and the brine chamber, the NaOH membrane resisting the passage of Chloride ions and permitting the passage of Sodium ions;
      a first electrode—the HClO electrode—in the HClO chamber;
      a second electrode—the NaOH electrode—in the NaOH chamber;
      said first and second electrodes being electrically connected to the positive and negative taps, respectively, of a DC power supply having a positive tap and a negative tap;
      a first pump—the HClO pump—having a pressure and a vacuum side;
      a first product container—the HClO container—having an exit and a return;
      the pressure side of the HClO pump being connected to the inlet of the HClO chamber, the vacuum side of the HClO pump being connected to the exit of the HClO container, and the outlet of the HClO chamber being connected to the return of the HClO container;
      a second pump—the NaOH pump—having a pressure and a vacuum side;
      a second product container—the NaOH container—having an exit and a return;
      the pressure side of the NaOH pump being connected to the inlet of the NaOH chamber, the vacuum side of the NaOH pump being connected to the exit of the NaOH container, and the outlet of the NaOH chamber being connected to the return of the NaOH container;
   said product containers being filled at the start of the operation of the apparatus with water, the connection from product containers to pumps to ionizing chambers and back to product containers presenting closed loops, so that when said pumps are energized the water from said product containers is pumped through said ionizing chambers and back through said product containers continuously through said closed loops to increase the concentration of the products produced in the ionizing chambers, such that when said DC power supply is energized HClO is produced in the first ionizing chamber, and NaOH is produced in the second ionizing chamber; and
   energizing said DC power supply so as to produce HClO in the first ionizing chamber, and NaOH in the second ionizing chamber.

8. The process of claim 7, further comprising:
   providing said closed loops with sensors, which measure the pH and/or oxidation reduction potential (ORP) of the liquid passing through said closed loops;
   connecting said sensors to one or more controllers;
   connecting said one or more controllers to said pumps and said DC power supply and controlling the operation of all three according to the measurements supplied by said sensors;
while also programming said one or more controllers to energize said pumps and DC power supply until sensor measurements indicate that pH and/or ORP equal predetermined values.

9. The process of claim 8, wherein said brine chamber has an inlet and an outlet;
   said brine chamber is connected to a third pump;
   said third pump is connected to a brine reservoir;
   said brine reservoir is connected to said brine chamber, describing a third closed loop;
   and further comprising controlling said third pump by said one or more controllers.

10. The process of claim 9, comprising:
    utilizing a plurality of electrolyzer cells, and
    connecting the identical chambers of the respective cells to each other within their respective closed loops in series, in parallel, or in series-parallel.

11. The process of claim 10, further comprising equipping said brine reservoir with an air filter vent for the release of gas by-products.

12. The process of claim 7, further comprising controlling and energizing said pumps and said DC power supply by a timer, and adapting said timer to energize said pumps and DC power supply for a period or a plurality of periods of time necessary for the apparatus to produce a specific concentration of product or a plurality of specific concentrations of product.

13. The apparatus of claim 2 further comprising a temperature sensor for monitoring the temperature of the salt solution in the brine chamber, which temperature sensor communicates with said one or more controllers;
    the apparatus further comprising an additional closed loop comprising a heat exchanger and an additional pump, said one or more controllers being adapted to direct the salt solution through said additional closed loop and heat exchanger when triggered by a particular temperature reading detected by said temperature sensor.

14. The method of claim 8 further comprising equipping the brine chamber with a temperature sensor for monitoring the temperature of the salt solution in the brine chamber, which temperature sensor communicates with said one or more controllers;
    and further comprising adding an additional closed loop comprising a heat exchanger and an additional pump, said one or more controllers directing the salt solution through said additional closed loop and heat exchanger when triggered by a particular temperature reading detected by said temperature sensor.

15. The apparatus of claim 2, wherein said one or more controllers control the pumps and DC power supply by turning them on and off.

16. The process of claim 8, wherein said one or more controllers control the pumps and DC power supply by turning them on and off.

* * * * *